Oct. 20, 1953  C. H. HOHNADEL  2,656,257
APPARATUS FOR PELLETING CHAIN STRUCTURE CARBON BLACK
Filed Oct. 11, 1948  2 Sheets-Sheet 1
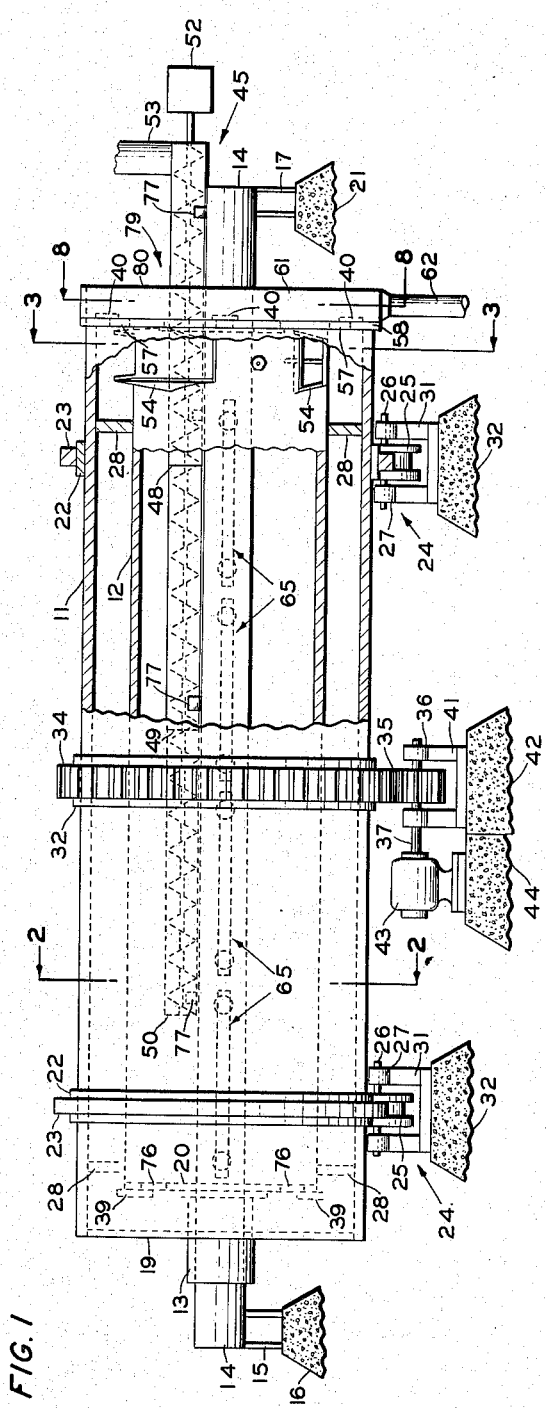
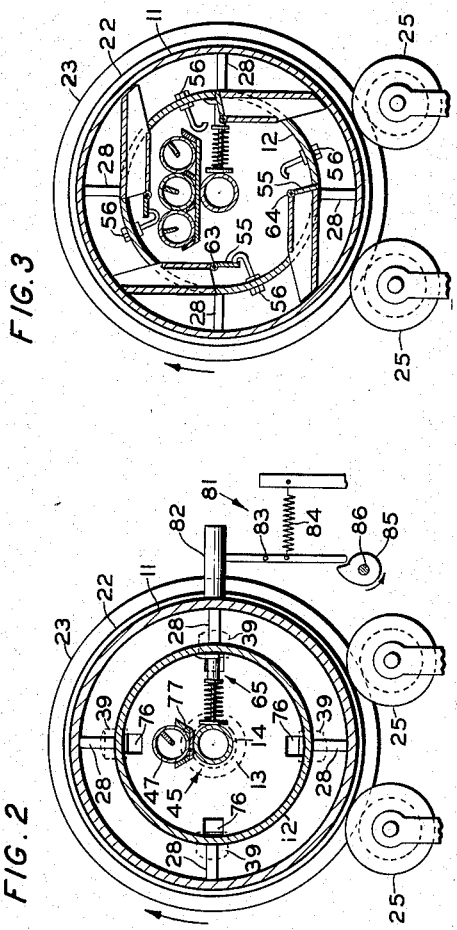
INVENTOR.
C. H. HOHNADEL
BY Hudson & Young
ATTORNEYS Oct. 20, 1953 C. H. HOHNADEL 2,656,257
APPARATUS FOR PELLETING CHAIN STRUCTURE CARBON BLACK
Filed Oct. 11, 1948 2 Sheets-Sheet 2

INVENTOR.
C. H. HOHNADEL
BY Hudson & Young
ATTORNEYS

Patented Oct. 20, 1953

2,656,257

UNITED STATES PATENT OFFICE 2,656,257

APPARATUS FOR PELLETING CHAIN STRUCTURE CARBON BLACK

Charles H. Hohnadel, Kermit, Tex., assignor to Phillips Petroleum Company, a corporation of Delaware Application October 11, 1948, Serial No. 53,788

3 Claims. (Cl. 23—259.5)

This invention relates to the pelleting of chain structure carbon black. In one of its more specific aspects it relates to an apparatus and a method of using that apparatus for pelleting chain structure carbon black. In a still more specific aspect it relates to the pelleting of such chain structure carbon blacks as high modulus furnace blacks.

The carbon black industry has for many years produced carbon black by the incomplete combustion of natural gas and other similar light hydrocarbon feed stocks. This carbon black was known generally as channel black and was produced by the well known channel process. This channel black has been referred to as hard processing or medium processing black, and sometimes as just hard black. A modified form of channel black is referred to as easy processing channel black. Prior to 1940 this type of black amounted to about 90% of the total carbon black produced in the United States. The carbon black produced by the channel process and its many modifications could be readily formed into substantially dustless granules or pellets by numerous processes well known to the art. This fine particle type of carbon black was exceptionally well suited for incorporation in natural crude rubber.

With the development of synthetic rubber such as GR-S it was found that for some purposes the fine particle channel black was unsatisfactory for compounding because of its hard processing and high heat build-up characteristics. The original channel process was modified slightly to produce a modified product sometimes called easy processing black which, however, was not completely satisfactory for compounding in GR-S rubber stock.

In order to produce satisfactory synthetic rubber for some purposes such as mechanical goods, extruded products, etc., it was found necessary to develop a new type of carbon black now referred to as high modulus furnace (HMF) black which is a structure carbon. This type of carbon black has the ability to maintain a chain-like grouping when dispersed in a rubber compound as contrasted to the individual particle type channel blacks which disperse more nearly completely as single discrete particles.

I use the terms chain-like grouping, chain structure or just "structure" carbon black to refer to the high modulus furnace blacks which are characterized by carbon black particles or groupings having a chain-like structure.

Chain structure carbon black may be produced by the incomplete combustion of various hydrocarbon fractions such as gas oil or more viscous asphaltic crude oil fractions, or even lighter hydrocarbons. The structure carbons so produced can not be pelletized easily by any of the well known processes used for pelleting the particle type channel black. The failure of the known pelleting processes may be due to a surface condition of the carbon black particles which condition is inherent in chain structure carbons. There does not appear to be any rigid theoretical explanation of the phenomenon.

Many prior processes for the pelleting of furnace blacks involve the use of long cylindrical shaped pelleting mills. I have developed a pelleting mill for use in pelleting chain structure blacks which is about half the length of the mills (of the prior art and currently in use) for pelleting this type of carbon black. My mill provides a pelleting apparatus in which the effective length of the mill is the same as the length of many of the prior art mills and yet the mill is only about half their actual length.

An object of my invention is to provide a process for pelleting chain structure carbon black.

Another object of my invention is to provide a process for producing dense and hard pellets of chain structure carbon black from flocculent chain structure carbon black.

Another object of my invention is to provide an apparatus for use in pelleting chain structure carbon black.

Still another object of my invention is to provide an apparatus which is relatively small and conserves plant space and yet has the capacity of a larger mill of conventional design for pelleting chain structure carbon black.

These and other objects and advantages will be apparent upon reference to the following detailed description and annexed drawing which respectively describes and illustrates a preferred embodiment of my invention.

In the drawing, Figure 1 is a longitudinal view of a pellet mill embodying my invention in elevation, partly with the outer shell removed, and partly with both the outer shell and the inner shell removed, to show details of construction.

Figure 2 is a cross sectional view taken on the line 2—2 of Figure 1.

Figure 3 is a cross sectional view taken on the line 3—3 of Figure 1.

Figure 4:
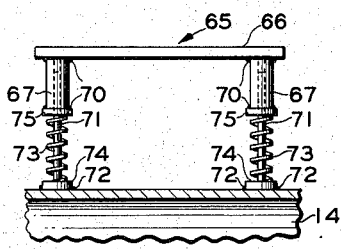
Figure 4 is a plan view of a scraper assembly.

Referring now to the drawing, and specifically to Figure 1, my pelleting apparatus consists of a drum 11 which is an elongated cylindrical steel drum. Within drum 11 is a second and smaller cylindrical steel drum 12. The inner drum 12 and the outer drum 11 are so disposed with respect to one another that they have a common longitudinal axis. One end of the outer drum 11 is closed with a plate 19 which has a hole in its center through which is placed a pipe or tube 14. Within this opening in the plate 19 is also disposed a steel cylinder 13, one end of which is rigidly attached to the adjacent end wall 20 of the inner drum 12. The cylinder 13, as mentioned, surrounds the pipe 14 but pipe 14 does not in any respect support the inner drum 12 nor the outer drum 11. The cylinder 13 may be slightly smaller in outside diameter than the circular opening in the end plate 19 of the outer drum or the plate 19 may be welded to the drum 13 for rigidity, if desired. The cylinder 13 is larger in diameter than the outside diameter of pipe 14 and pipe 14 is centered as nearly as possible in the cylinder 13. The pipe 14 is intended not to carry any load from the drum 11 or the drum 12, but is intended to support wall scrapers 65 and some screw feeders 46, 47 and 51. The other ends of the drums 11 and 12 are attached to an annular shaped end plate 58. The outer drum 11 is attached to this end pltae 58 at about the outer periphery of the end plate while the end of the drum 12 is attached to this end plate 58 around a circle some little distance from the inner diameter of this annular plate 58. The circular opening 59 in the annular plate 58 accommodates the support pipe 14 and the screw feeders 46, 47 and 51. These screw feeders and the tube 14 are so positioned within the central drum 12 that the drums may be rotated without interference. Some struts or spokes 28 rigidly attach the inner drum 12 to the outer drum 11. These struts are intended to carry all or at least a major portion of the weight of the inner drum. The plate 58 is intended to carry none or at least a very minor portion of the weight of the inner drum.

Some steel bands 22 are placed tightly around the outer drum 11 in the approximate positions indicated on the drawing and around these bands 22 are placed heavy steel rings 23. These rings act as tires for supporting the drum assembly. In supporting the drum assembly each ring 23 rests on a pair of roller support assemblies 24. These latter assemblies are composed of small diameter rollers 25 mounted on shafts 26, the ends of which are supported in bearings 27 and the bearings in turn are supported by U-shaped members and these latter members in turn are held in place on concrete bases or piers 32.

One end of the pipe or tube 14 is supported by support member 15 which in turn rests on a concrete pier 16. The other end of the tube 14 is supported by a steel support 17 which rests upon a concrete pier 21.

A steel band 33 is placed around the outer drum at about the center longitudinally, as shown in Figure 1 and around this band 33 is a gear wheel 34 and very tightly attached thereto. A source of motive power 43 drives a shaft 37 to turn a gear wheel 35 which gear wheel meshes with the teeth of the large wheel 34 for rotation of the pelleting mill. The source of power 43 may be an electric motor or other power means as desired, and as illustrated in Figure 1 the electric motor 43 rests upon a concrete base 44. The drive shaft 37 is supported by bearings 36 which in turn are suppotred by the U-shaped member 41 which latter rests upon a concrete base 42.

Figure 5:
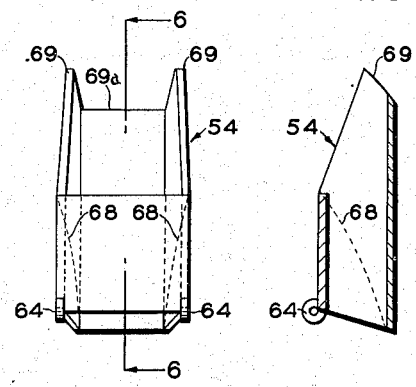
Figure 5 is a plan view of a recycle scoop.
Figure 6:
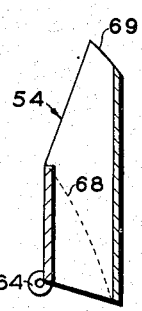
Figure 6 is a longitudinal sectional view of the recycle scoop taken on the line 6—6 of Figure 5.
Figure 7:
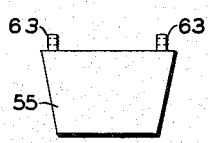
Figure 7 is a plan view of a lid for closing one end of the recycle scoop.
Figure 7A:
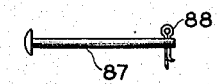
Figure 7a is a plan view of a hinge pin.
Figure 8:
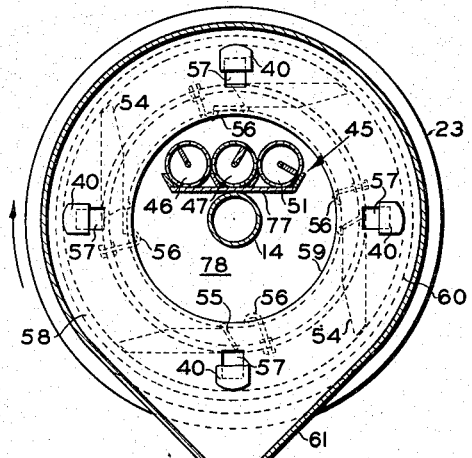
Figure 8 is a cross sectional view through the hood covering the feed and discharge end of my pelleting apparatus.

In one end wall of the inner drum 12 are placed several openings or weirs 76. In Figure 2 are shown four of these weirs 76, but more than four or less than four may be used, depending on the operating conditions of the apparatus and the hourly throughput of carbon black. In the other end of a pellet mill and in the annular plate 58 are some openings or weirs 57. These weirs 57 are placed relatively close to the outer circumference of the plate 58. Four weirs 57 are shown in Figure 8 but I do not wish to limit my apparatus to four of these weirs since under certain conditions it might be desirable to use more than four or under other conditions it might be desirable to use less than four. These weirs 57 are intended to be positioned in the annular plate 58 so that access may be had into the annular space between the drums 11 and 12 and in operation of the pellet mill finished pellets are discharged from the annular space between the two drums through these weirs into a funnel shaped receiving apparatus 61. The small diameter end of this funnel 61 is connected with a pipe 62 for transfer of treated material from the mill to storage or other disposal, as desired. Some dippers 54 are inserted into openings in the inner drum 12. These dippers may be constructed merely from a flat piece of steel with the sides turned up in scoop fashion and a piece of metal covers a portion of the top of the dipper so that a plan view of the dipper as shown in Figure 5 and a sectional view in Figure 6 will show a portion of the top of the dipper closed and another portion of the top of the dipper open. The dotted lines 68 are the weld lines between sides of the dippers 54 and the circular edges of the openings in the inner cylinder 12 into which the dippers extend. The covered end of the dipper extends into the inner drum 12 while the portion of the dippers which is open or not covered extends into the annular space between the drums 11 and 12. The ends 69 of the dippers are welded to the inside of the outer drum 11 and also the dipper edge or scoop edge 69A is welded to the inner surface of the outer drum 11. Thus with both sides of the dippers 54 welded along the dotted lines 68 to the inner drum and along the edges 69 and 69A to the outer drum a very rigid and strong construction results. The exact position of these scoops 54 may be seen in Figures 3 and 8 and it can be seen that when the mill assembly rotates in a clockwise direction the scoops 54 will in the downward position pick up a quantity of any loose material which is in the annular space between the drums 11 and 12. Upon continued rotation of the drum this material will flow by gravity through the end of the scoop into the inner drum 12. To prevent material from flowing from the inner drum to the annular space between the two drums I have provided a lid for the inner end of each of the scoops 54. These lids are hinged into position on the end of the scoop by means of the ears 63 on the lid and the ears 64 at the end of the scoop and through openings in the ears extends a hinge pin 87 having a head on one end and a key on the other end.

To prevent the lids 55 from remaining open permanently I have furnished some lid stop members 56. These members may be hooked type members welded to the side of the inner drum or bolted through the drum. Each stop member 56 is intended to be disposed in such relation to a lid 55 that as the mill rotates in a clockwise direction the lids will swing open only to a desired extent, then upon continued rotation in a clockwise direction the lids will fall by gravity to close the ends of the scoops. In this manner carbon black cannot pass from the inner drum to the outer drum at the feed end of the mill.

Within the inner drum 12 are positioned some scraper assemblies 65 which are intended to remove any carbon black which tends to adhere to the inner surface of the drum 12. In an elongated pellet I prefer to use several of these scraper assemblies 65 and to make each assembly relatively short. In the mill as illustrated in the drawing, four of these scraper assemblies are shown and each may be about six feet in length to be positioned in a 24 foot long inner drum 12. Each scraper assembly 65 is composed of a scraper member 66 which is welded at 70 to two sleeves 67. Each sleeve 67 is intended to accommodate one end of an arm 71 as shown in Figure 4. The other end of each arm 71 is welded at 72 to the pipe 14 and a push plate 75 is welded to an end of the sleeve 67 while other push plates 74 are attached to the arms 71 adjacent the tube 14. Around the arms 71 and between the pairs of corresponding push plates are placed compression springs 73. These springs 73 are intended to push the scraper arm 66 toward the inner wall of the drum 12, thereby scraping loose any adhering carbon black as the drum rotates. The scraper assemblies are attached to the side of the tube 14 so that the scraper bar 66 will touch the wall of the drum 12 at a point of downward movement of the periphery of the drum 12. These scrapers 65 are positioned in this manner so that falling carbon black scale will not interfere with the pellet bed as the mill rotates in a clockwise direction.

The carbon black feeder assembly 45 is composed of three individual screw feeders 46, 47 and 51. In using three screw feeders to feed flocculent carbon black to a pellet mill as herein described, screw feeder 51 may terminate at point 48 while screw feeder 46 may terminate at point 49 and the central feeder 47 may terminate at point 50. Some feeder supports 77 are in turn supported by the pipe 14. Motive power for turning the feeder screws may be furnished by any source of power as desired, as for example, by one or more electric motors, one of which is diagrammatically illustrated by reference numeral 52. The feeder tubes receive carbon black feed through a hopper 53, the bottom of which opens into the feeder tubes.

For removal of adhering carbon black from the inner surface of the outer drum 11, I have provided a hammer assembly 81 illustrated in Figure 2. A hammer 82 hinged at a pivot point 83 is adapted to be operated by a cam 85. The cam 85 is mounted on a shaft 86. Upon rotation of the cam 85 in the direction indicated the end of the hammer handle is moved by the cam which movement causes the hammer head 82 to hit the outer drum 11, thereby knocking loose adhering carbon black. To re-position the hammer, I have provided a tension spring 84. In the drawing is shown only one hammer-cam unit but the number of hammer-cam units required for the assembly may vary from six to twelve, preferably eight to ten, it merely being necessary to have a sufficient number of these hammers that the wall of the outer mill be kept reasonably free from adhering carbon black. The several cams 85 used to operate the several hammers may be mounted on separate shafts but it is preferred that the several cams be mounted on one common shaft and this one shaft can then be powered by one power unit. The several hammers may likewise be mounted on a common shaft but in case of the hammers it may be preferred under some circumstances to mount each hammer individually.

Figure 9:
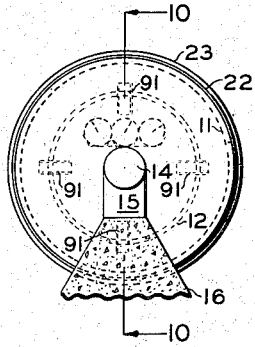
Figure 9 is, in part, an end elevation of my pellet mill showing a spout type of apparatus for transfer of material from the inner drum to the outer drum.

In Figure 9 is shown an elevation of a portion of my pelleting apparatus illustrating the positioning of some spouts 91 for transfer of carbon black undergoing pelleting from the inner drum 93 to the annular space between the drum as an alternative embodiment to the weirs 76 and slides 39 of Figure 1. Adjustments of these slides 39 can be made through access openings, not shown, provided in end plate 19.

Figure 10:
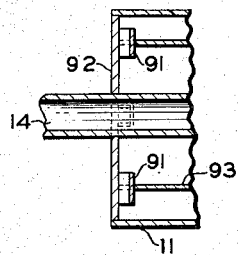
Figure 10 is, in part, a longitudinal sectional view of the end of the pellet mill shown in elevation in Figure 9 and taken on the line 10—10 of Figure 9.

Figure 10 further illustrates the positioning of these spouts 91 with respect to the inner drum 93 and the end wall 92. In this embodiment the inner drum 93 may be of the same length as the outer drum 11. The spouts 91 are positioned as shown and the depth of the bed of carbon black in the inner drum 93 is controlled by the length or height of the spouts 91 extending into the inner drum 93. The spouts 91 may be adjustable radially to increase or to decrease the height of the spout in the pellet bed in the inner drum.

In the operation of the pellet mill of Figure 1 of the drawing, the mill may be charged with a load of carbon black pellets or flocculent black to about a normal operating depth in the inner drum 12 and in the annular space between the inner drum 12 and the outer drum 11. This normal operating depth of black in the inner mill 12 may vary from 6 to 16 inches in ordinary mills of commercial size. By mills of commercial size I mean the inner drum 12 may be from three to six or eight feet in diameter while the outer drum 11 may well be from five to eight or ten feet in diameter. In larger diameter inner mills the outer mill should be proportionately still larger since in a larger mill a deeper bed of carbon black may be carried. In an inner mill of four and one-half feet diameter the outer shell should be about six and one-half feet in diameter.

The openings or weirs 76 in the downstream end of the inner mill are so positioned in the end wall 20 that the desired depth of bed will be maintained in this mill. If desired the weirs 76 may be so constructed as to be adjustable in both distance from the cylindrical wall of the drum 12 and as to size of opening. Such construction is known in the art and will not be described in detail for purpose of brevity and simplicity.

In like manner the discharge weirs 57 in the end wall of the annular space may be constructed as to be adjustable in both size and position. I have shown both sets of weirs, that is, weirs 76 and weirs 57 as being four in number equally spaced around a circle. More or less weirs may be used depending upon operating conditions. It might be well during construction of the mill to make six or eight weirs in each set, and to make them adjustable in both position and size of opening, then in case a smaller number of weirs is needed some can be completely closed.

In case spouts 91 are used in the type of mill illustrated in Figures 9 and 10, the length of the spouts extending into the inner drum 12 may be made adjustable, and this length will of course determine the bed depth. Likewise, the number of spouts 91 built into the mill may be more than is usually necessary to use to make certain proper operation at high throughputs.

When the mill is charged with pellets, flocculent carbon black feed may then be added. The carbon black to be pelleted may come directly from an electro precipitator, bag filters or from run storage bins through a conduit, not shown. This conduit may discharge its black into the hopper 53 from which the black is transferred by the conveyors 46, 47 and 51 into the mill to be discharged into the pellet bed at the three spaced points with respect to the length of the mill. The three conveyors 46, 47 and 51 have fully open discharge ends referred to by reference numerals 48, 50 and 49, respectively, so that the flocculent black being added may flow freely from each feeder. That is, the black conveyed by conveyor 46, the shortest conveyor, will be delivered to the bed of carbon black at a point nearest the inlet end of the mill. Conveyor 51 is the next longer conveyor, and it delivers charge stock to the carbon black in process at a point further down stream. Conveyor 47, the longest, delivers black farthest down stream.

By such multipoint addition of flocculent carbon black to a bed of pellets, it is intended that a layer of flocculent black be added to the surface of a pellet, then compacted and the pellet densified before another layer of black is added. In this manner and as illustrated herein, there are three points of flocculent black addition. More points of addition or even less than shown may be used, depending upon such conditions as mill size, throughput, etc.

After the final addition of flocculent carbon black the pellets are further cascaded and rolled prior to their transfer from the inner or pelleting drum to the hardening or finishing (outer) drum.

As mentioned hereinbefore, the pellets, flocculent black or whatever form of black reaches the end of the pellet mill opposite the feed end, passes through the spouts 91 into the annulus or through the weirs 76 into the short end zone and then into the annulus. Upon continuous addition of recycle pellets into the feed end of the inner mill, material flow in the inner mill is from right to left in the apparatus illustrated. In like manner, material in the annulus tends to flow in the opposite direction, that is, from left to right, to exit from the annulus through the weirs 57. The weirs 57 are intended to be adjustable as to positioning from the wall of the outer drum 11 by adjustment of the slide covers 40. This positioning controls the depth of pellet bed in the annulus.

I have illustrated in the drawing and described hereinabove the scoops or dippers 54. These dippers disposed in the positions shown are intended to be one means of withdrawing carbon black pellets from the fully pelleted black and adding it to the feed end of the pelleting or inner drum, or in other words the dippers are one means of carrying out pellet recycling.

In the operation of the dippers 54 in transferring pellets from the annulus to the inner drum, the open end of the dipper fills with pellets as the dipper passes the lower portion of its circular path. As the dipper rises following clockwise rotation, as indicated in Figure 8, the pellets in the open end of the dipper flow toward the end of the dipper which is positioned within the inner drum. Upon further rotation of the drum the dipper reaches such a position that the lid or hinged plate 55 swings away from its closed position to open the inner end of the scoop to permit its load of pellets to flow into the inner mill. Stops 56 serve to hold the lids 55 in such position that as a scoop approaches the bottom of its cycle, its lid falls against the end of the scoop to close the scoop against possible passage of carbon black from the inner mill to the annulus.

In the drawing are shown four scoops 54, but it is to be understood that more or fewer than four scoops may be used, or even none at all.

Another means of handling the recycling of the pellets is to withdraw all pellets from the annulus through the weirs 57 into a divider and cut out one portion of pellets to be elevated by a bucket elevator, screw conveyor or other satisfactory method and added to the inner drum through a hopper and chute arrangement or other means.

Such a pellet mill as illustrated in the drawing and herein described may be, for example, equivalent in capacity to a mill about double its length. A mill of this type may be about twenty-six and one-half feet in length, that is, the overall length of the outer drum 11. The inner drum may be twenty-five feet in length and four and one-half feet inside diameter. The diameter of the outer drum may be about six and one-half feet, making the annulus one foot across, and twenty-five feet in length. Such a combination pellet mill may pellet about 1000 pounds of chain structure carbon black per hour. About 2000 pounds per hour of pellets are recycled making the actual throughput through each portion of the mill about 3000 pounds per hour.

The several scraper assemblies 65 serve to keep the inner wall of the pelleting section free from accumulations of carbon black scale. The hammer system 81 is used for maintaining the inner wall of the outer mill or hardening section (annulus) free from accumulations of carbon black.

The pelleted product leaves the annulus through the weirs 57 and falls through the funnel 61 into the pipe 62 for passage to storage or to shipment or to other disposal as desired.

The funnel apparatus 61 is integral with an end cover or hood apparatus 79 which does not rotate with the mill. The front wall or cover 80 of this hood apparatus 79 may be removable so that the feed and discharge end of the pelleting apparatus may be inspected. Figure 8 is a cross sectional elevation of the pelleting apparatus taken on the line 8—8 of Figure 1. Thus Figure 8 shows in reality about what one would see if the cover 80 were removed. The end wall 58 covering only a portion of the end of the double mill is an annular shaped plate and its outer diameter 60 is the same as the diameter of the outer drum 11. The small or inner diameter 59 of this annular plate is of course the diameter of the circular opening through which the screw feeder system 45 and the support pipe 14 extend. The diameter of this opening must be sufficiently large to accommodate the feeder 45 and support pipe 14 while the mill is rotating.

A plate 78 which may be made of wood or other material as desired may be circular in form to cover the central opening in the annular end plate 58. This plate 78 may be constructed in sections so that it can be installed with expenditure of a minimum amount of labor since this plate has openings just sufficient to accommodate the feeder assembly 45 and the support pipe 14. The plate is useful in confining the carbon black dust during the pelleting operation and it may preferably be installed inside the mill adjacent the end plate 58, thereby forming a tight seal with the inner surface of this plate 58. The plate 78, however, may be positioned outside the mill and adjacent the annular plate 58.

The mill may be rotated by the gear system described or it may be rotated by a wheel system consisting of inflated pneumatic tires on wheels similar to those used on automobiles.

The gear wheel 34 may be positioned at either end of the pellet mill if desired but it is preferable to position this driven gear 34 at about the center of the length of the mill.

The tumbling of the pellets in the annulus of the mill appreciably hardens the pellets due to the greater peripheral speed of the exterior drum 11 over the peripheral speed of the pelleting drum 12. In the actual formation and growth of pellets mill speeds greater than a certain maximum converts the pellet forming bed to dust while after pellets are fully formed they may be hardened in a mill of diameter equal to the diameter of the pellet producing mill at a greater rotational or peripheral speed than that permissible in forming the pellets. Such hardening may also be produced in a mill of greater diameter than the diameter of the pellet forming mill at the same rotational speed but at a greater peripheral speed. The greater peripheral speed causes a greater shearing action on the fully formed pellets to harden them than is permissible to use during pellet formation.

Having disclosed my invention, I claim:

1. An apparatus for pelleting carbon black comprising a pair of elongated, hollow, cylindrical drums of different diameters, disposed horizontally and having end walls, the drum of smaller diameter being disposed concentrically within the drum of larger diameter to form an elongated annular space therebetween, means for rigidly attaching one drum to the other drum, means for rotating the drums about their common axis, a horizontally disposed open end screw conveyor extending from the inlet end of the inner drum throughout a major portion of the length thereof for introducing flocculent carbon black, means for transferring carbon black from the other end of the inner drum to the adjacent end of the outer drum, and means for removing carbon black pellets from the end of the annular space adjacent the inlet end of the inner drum.

2. An apparatus for pelleting carbon black comprising a pair of elongated, hollow, cylindrical drums of unequal diameters, disposed horizontally and having end walls, the drum of smaller diameter being disposed concentrically within the drum of larger diameter to form an elongated annular space therebetween, the end wall of the larger drum at one end also forming the end wall of the smaller drum at the corresponding end termed the inlet end of the apparatus, each drum having a separate end wall at the other end thereof, means for rotating the drums about their common axis, a plurality of open discharge end screw conveyors extending axially from the inlet end of the inner drum to a plurality of different points longitudinally and intermediate the drum ends for introduction of flocculent carbon black at said plurality of points, means for transferring carbon black from the opposite end of the inner drum to the corresponding end of the outer drum, a scoop extending from the cylindrical wall of the outer drum through the cylindrical wall of the inner drum at said inlet end for transferring pellets from the annulus into said inner drum, a gravity operated lid for closing the end of the scoop in said inner drum against flow of carbon black from the inner drum into the annulus and means for removing carbon black pellets from said annular space.

3. An apparatus for pelleting carbon black comprising a pair of elongated, hollow, cylindrical drums of equal lengths but of unequal diameters, disposed horizontally and the drum of smaller diameter being disposed concentrically within the drum of larger diameter to form an elongated annular space therebetween, said drums having common end walls, one end of the pair of drums being termed the inlet end and the other end termed the transfer end, each pair of adjacent drum ends having common end walls, means for rotating the drums about their common axis, a plurality of open discharge end screw conveyors extending axially from the inlet end of the inner drum to a plurality of different points longitudinally and intermediate the drum ends for introduction of flocculent carbon black at said plurality of points; means for transferring carbon black from the opposite end of the inner drum to the corresponding end of the outer drum, a plurality of scoops extending from the cylindrical wall of the outer drum through the cylindrical wall of the inner drum at said inlet end for transferring pellets from the annulus to said inner drum, said plurality of scoops disposed at uniform intervals around the circumference of said drums, a gravity-operated lid for closing the end of each scoop in said inner drum against flow of carbon black from the inner drum into the annulus, and means for removing carbon black pellets from said annular space.

CHARLES H. HOHNADEL.

References Cited in the file of this patent

UNITED STATES PATENTS

| Number | Name | Date |
|---|---|---|
| 1,980,130 | Fasting | Nov. 6, 1934 |
| 2,052,329 | Wendeborn | Aug. 25, 1936 |
| 2,164,164 | Price | June 27, 1939 |
| 2,311,154 | Carney | Feb. 16, 1943 |
| 2,422,989 | Skoog | June 24, 1947 |
| 2,503,361 | Studebaker | Apr. 11, 1950 |